United States Patent
Saito (10) Patent No.: US 7,438,664 B2
(45) Date of Patent: Oct. 21, 2008

(54) CONTROL APPARATUS FOR VEHICLE AND HYBRID VEHICLE

(75) Inventor: Kenichi Saito, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 364 days.

(21) Appl. No.: 11/408,023

(22) Filed: Apr. 21, 2006

(65) Prior Publication Data

US 2006/0240940 A1  Oct. 26, 2006

(30) Foreign Application Priority Data

Apr. 22, 2005  (JP) ............... 2005-125070

(51) Int. Cl.
*B60K 1/02* (2006.01)
*F16H 59/64* (2006.01)

(52) U.S. Cl. .................... 477/3; 477/98
(58) Field of Classification Search ............. 477/97, 477/98, 3; 180/65.2; 903/941, 942; 290/40 C
See application file for complete search history.

(56) References Cited

U.S. PATENT DOCUMENTS

| | | | |
|---|---|---|---|
| 6,026,921 A | 2/2000 | Aoyama et al. | |
| 6,422,001 B1 * | 7/2002 | Sherman et al. | 60/274 |
| 6,424,053 B1 * | 7/2002 | Wakashiro et al. | 290/40 C |
| 6,672,050 B2 * | 1/2004 | Murata et al. | 60/284 |
| 6,939,263 B2 * | 9/2005 | Wakashiro et al. | 477/3 |

FOREIGN PATENT DOCUMENTS

| | | |
|---|---|---|
| JP | A 2002-161841 | 6/2002 |
| JP | A 2002-201981 | 7/2002 |
| JP | A 2002-364409 | 12/2002 |
| JP | A 2003-74325 | 3/2003 |
| JP | A 2004-270471 | 9/2004 |

* cited by examiner

*Primary Examiner*—Roger Pang
(74) *Attorney, Agent, or Firm*—Oliff & Berridge, PLC (57) ABSTRACT

In a hybrid vehicle incorporating an internal combustion engine having an in-cylinder injector and a motor, when the temperature of the in-cylinder injector rises, if a current engine operation point is inside a prescribed intermediate load range (deposit risk range) where the temperature of the in-cylinder injector tends to rise, an engine load is increased or reduced while an engine speed is maintained, to thereby change the engine operation point to an engine operation point inside a low load range or to an engine point inside a high load range. A reduction or an increase in the engine output associated with the change of the engine operation point is compensated for by increasing or reducing the output of the motor. Thus, deposit accumulation in the in-cylinder injector is avoided.

13 Claims, 5 Drawing Sheets

CONTROL APPARATUS FOR VEHICLE AND HYBRID VEHICLE

This nonprovisional application is based on Japanese Patent Application No. 2005-125070 filed with the Japan Patent Office on Apr. 22, 2005, the entire contents of which are hereby incorporated by reference.

BACKGROUND OF THE INVENTION

1. Field of the Invention

The present invention relates to a control apparatus for a vehicle and a hybrid vehicle, and more particularly to control of an operation of an internal combustion engine in a hybrid vehicle incorporating the internal combustion engine and other source of drive power, the internal engine having an in-cylinder injector.

2. Description of the Background Art

There is known as one type of an internal combustion engine (engine) a configuration including an in-cylinder injector that directly injects fuel into a cylinder. As the in-cylinder injector experiences high temperatures in the combustion chamber, clogging tends to occur due to accumulation of deposits caused by the increased temperature at its tip. Such clogging of the injector may hinder normal fuel injection, and hence may invite fluctuations in the engine output. Accordingly, when there is a degree of freedom in use of the in-cylinder injector, care must be taken to avoid such clogging of the in-cylinder injector.

For example, Japanese Patent Laying-Open No. 2002-364409 (Patent Document 1) discloses an internal combustion engine that has both an intake manifold injector injecting fuel into an intake manifold and/or an intake port and an in-cylinder injector and that carries out an operation switching between homogeneous combustion and stratified charge combustion. Patent Document 1 discloses a configuration of carrying out fuel injection using both of the injectors during a homogeneous combustion operation to thereby address such a problem that the temperature of the in-cylinder injector (injector for direct injection) rises and deposits accumulate if the intake manifold injector (port injection) is solely operated in homogeneous combustion.

However, with the internal combustion engine having the configuration disclosed in Patent Document 1, it is still difficult to concurrently attain stabilization of a combustion state and suppression of deposits in the in-cylinder injector, in a partial load range such as a low-speed and high-load range.

Japanese Patent Laying-Open No. 2002-161841 (Patent Document 2) discloses a hybrid vehicle incorporating an internal combustion engine with an in-cylinder injector, and other driving force source of the vehicle such as a motor. Patent Document 2 discloses a configuration for suppressing carbon adhesion to a spark plug and for removing carbon adhered to the spark plug in such a hybrid vehicle. Specifically, when it is determined that the spark plug causes carbon fouling based on an operation state of the internal combustion engine, control is exerted to increase an electric load applied to the internal combustion engine by the motor-generator to thereby increase the temperature of the combustion chamber of the internal combustion engine to suppress occurrence of carbon fouling.

However, with the internal combustion engine having the configuration disclosed in Patent Document 2, while it is effective for suppressing carbon adhesion to and for removing carbon from the spark plug in the internal combustion engine of a hybrid vehicle, the increased temperature of the combustion chamber may increase the temperature of the in-cylinder injector at its tip to cause the injector clogging by the accumulated deposits.

Thus, in a hybrid vehicle incorporating an internal combustion engine with an in-cylinder injector and a motor and the like, it is necessary to control the operation of the internal combustion engine in order to prevent the temperature at the tip of the in-cylinder injector from becoming excessively high and inviting clogging due to deposit accumulation.

SUMMARY OF THE INVENTION

An object of the present invention is to provide, in a hybrid vehicle incorporating an internal combustion engine with an in-cylinder injector and other driving force source of the vehicle such as a motor and the like, a control apparatus controlling the operation of the internal combustion engine so as to avoid deposit accumulation due to the increased temperature of the in-cylinder injector.

A control apparatus for a vehicle according to the present invention is a control apparatus for a vehicle incorporating an internal combustion engine and a motor that are capable of transmitting motive power to an axle, and includes a first output distribution controlling portion, a temperature determining portion, an operation range determining portion, an operation range changing portion, and a second output distribution controlling portion. The first output distribution controlling portion is configured to control motive power output distribution between the internal combustion engine and the motor with respect to a total required output in accordance with an operation state of the vehicle. The temperature determining portion is configured to determine whether a temperature of a fuel injection mechanism directly injecting fuel into a combustion chamber of the internal combustion engine exceeds a prescribed determination temperature. The operation range determining portion is configured to determine whether an operation point of the internal combustion engine is inside a prescribed range in which risk of deposit accumulation in the fuel injection mechanism is high. The operation range changing portion is configured to change the operation point to outside the prescribed range when the temperature of the fuel injection mechanism exceeds the prescribed determination temperature and the operation point of the internal combustion engine is inside the prescribed range. The second output distribution controlling portion is configured to modify the motive power output distribution determined by the first output distribution controlling portion so that an output from the motor is changed to compensate for an output change of the internal combustion engine associated with the change of the operation point by the operation range changing portion.

A hybrid vehicle according to the present invention includes an internal combustion engine and a motor that are capable of transmitting motive power to an axle and a control apparatus. The control apparatus controls motive power output distribution between the internal combustion engine and the motor with respect to total required output in accordance with an operation state of the hybrid vehicle, determines whether a temperature of fuel injection mechanism directly injecting fuel into a combustion chamber of the internal combustion engine exceeds a prescribed determination temperature, and determines whether an operation point of the internal combustion engine is inside a prescribed range in which risk of deposit accumulation in the fuel injection mechanism is high. Furthermore, the control apparatus changes the operation point to outside the prescribed range when the temperature of the fuel injection mechanism exceeds the prescribed determination temperature and the operation point of the internal combustion engine is inside the prescribed range and modifies the motive power output distribution so that an output from the motor is changed to compensate for an output change of the internal combustion engine associated with the change of the operation point.

With the control apparatus for a vehicle and the hybrid vehicle as described above, in the state where the temperature of the fuel injection mechanism (in-cylinder injector) exceeds a prescribed determination temperature, when an operation point of the internal combustion engine is positioned in a prescribed region where such an operation condition is attained that the temperature of the in-cylinder injector tens to rise and risk of deposit accumulation is high (deposit risk range: intermediate load range), the operation point of the internal combustion engine can be changed to outside the prescribed range while the total output of the internal combustion engine and other driving force source (motor) is maintained.

Accordingly, the operation point of the internal combustion engine can be set to avoid clogging due to deposit accumulation associated with the temperature rise of the fuel injection mechanism (in-cylinder injector), while satisfying the required output power in the entire vehicle and maintaining the drivability. As a result, setting of engine operation point avoiding clogging of an in-cylinder injector in a hybrid vehicle incorporating an internal combustion engine with the in-cylinder injector and a motor is enabled.

Preferably, in the control apparatus for a vehicle according to the present invention, the vehicle further incorporates a battery provided as a source of driving power of the motor. The operation range changing portion changes the operation point from inside the prescribed range to outside the prescribed range in a direction reducing an output from the internal combustion engine when a charge quantity of the battery is at least a reference quantity; and the second output distribution controlling portion increases the output from the motor by a reduction in the output from the internal combustion engine.

According to the control apparatus for a vehicle, when the charge quantity of the battery incorporated by the hybrid vehicle is reserved by at least the reference quantity and the output of the motor is reserved, by changing the engine operation point in a direction reducing the output from the internal combustion engine, clogging of the fuel injection mechanism (in-cylinder injector) is avoided while maintaining the output power of the entire vehicle and reserving the drivability.

Preferably, in the control apparatus for a vehicle according to the present invention, the vehicle further incorporates a battery provided as a source of driving power of the motor. The operation range changing portion changes the operation point from inside the prescribed range to outside the prescribed range in a direction increasing an output from the internal combustion engine when a charge quantity of the battery is less than a reference quantity; and the second output distribution controlling portion reduces the output from the motor by an increase in the output from the internal combustion engine.

According to the control apparatus for a vehicle, when the charge quantity of the battery incorporated by the hybrid vehicle is not enough and the output of the motor is hardly reserved, by changing the engine operation point in a direction increasing the output from the internal combustion engine, clogging of the fuel injection mechanism (in-cylinder injector) is avoided while maintaining the output power of the entire vehicle and reserving the drivability.

Alternatively, preferably, in the control apparatus for a vehicle according to the present invention, the operation range changing portion changes the operation point from inside the prescribed range to outside the prescribed range by changing a load factor of the internal combustion engine while maintaining a speed of the internal combustion engine.

According to the control apparatus for a vehicle as described above, by changing the load factor of the internal combustion engine while maintaining the speed of the internal combustion engine, the engine operation point can be changed for avoiding clogging of the fuel injection mechanism (in-cylinder injector) without giving discomfort to the driver.

Further preferably, in the control apparatus for a vehicle according to the present invention, whether the operation point of the internal combustion engine is inside the prescribed range is determined based on at least an intake air quantity of the internal combustion engine.

According to the control apparatus for a vehicle described above, whether the current engine operation point is inside the deposit risk range that is the operation condition where the temperature of the fuel injection mechanism (in-cylinder injector) tends to rise can easily and effectively be determined based on the intake air quantity for the internal combustion engine that can be measured with an airflow meter.

In particular, in the control apparatus for a vehicle according to the present invention, an operation range of the internal combustion engine includes a first range in which an air-fuel ratio setting value of the combustion chamber is set corresponding to a stoichiometric air-fuel ratio and a second range in which the air-fuel ratio setting value is set to increase fuel relative to the first range, and the operation range determining portion determines that the operation point of the internal combustion engine is inside the prescribed range when the intake air quantity of the internal combustion engine exceeds a reference quantity and the operation range is the first range.

According to the control apparatus for a vehicle described above, when the air-fuel ratio is set to increase fuel (to reduce A/F) in the high load region of the internal combustion engine, considering that the cooling effect is great in the range due to increased fuel injection, the deposit risk range can appropriately be set based on the intake air quantity and the air-fuel ratio setting value.

Therefore, according to the present invention, in a hybrid vehicle incorporating an internal combustion engine with an in-cylinder injector and other driving force source of the vehicle such as a motor, the operation of an internal combustion engine can be controlled to avoid deposit accumulation due to temperature rise in the in-cylinder injector.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will be described in detail hereinafter with reference to the drawings. The same or corresponding elements in the drawings have the same reference characters allotted, and details of the description will basically not be repeated.

Figure 1:
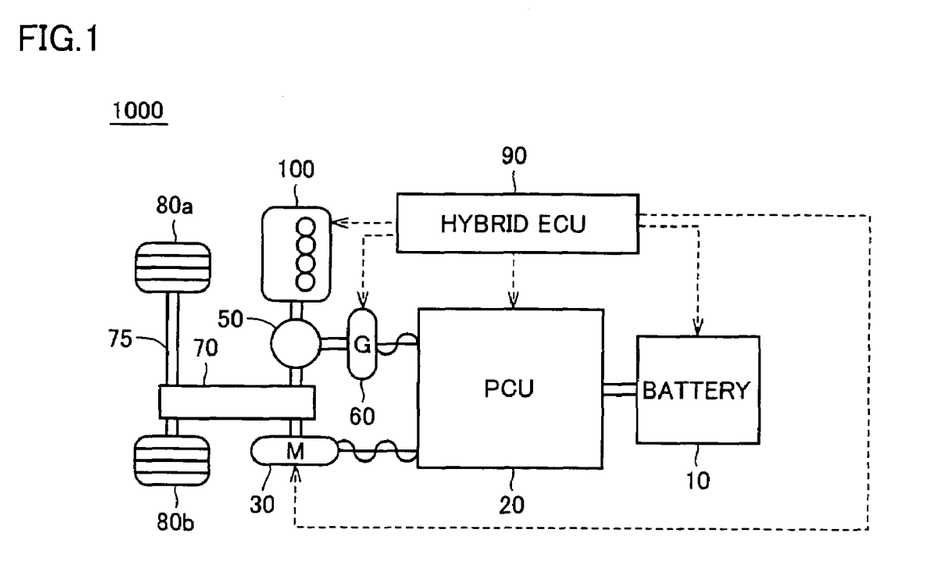
FIG. 1 is a block diagram showing an overall configuration of a hybrid vehicle controlled by a control apparatus for a vehicle according to an embodiment of the present invention.

FIG. 1 is a block diagram showing an overall configuration of a hybrid vehicle 1000 controlled by a control apparatus for a vehicle according to an embodiment of the present invention.

Referring to FIG. 1, hybrid vehicle 1000 includes, in addition to an engine (internal combustion engine) 100, a battery 10, a PCU (Power Control Unit) 20 for converting electric power, a motor 30, a power split device 50, a generator 60, a reduction gear 70, an axle 75, driving wheels 80a and 80b, and a hybrid ECU 90 controlling the overall operation of hybrid vehicle 1000. Although a hybrid vehicle of which driving wheels are front wheels only is shown in FIG. 1, a motor for driving the rear wheels may further be provided to configure a 4WD vehicle.

Battery 10 is configured by a secondary battery that can be charged (for example, a secondary battery such as a nickel metal hydride secondary battery or a lithium ion secondary battery). PCU 20 includes an inverter (not shown) converting a DC (Direct Current) voltage supplied from battery 10 into an AC (Alternating Current) voltage for driving motor 30. The inverter is configured to be capable of bidirectional power conversion, and also has a function of converting electric power (AC voltage) generated by regenerative braking operation of motor 30 and electric power (AC voltage) generated by generator 60 into a DC voltage for charging battery 10.

Further, PCU 20 may further include an up and down converter (not shown) carrying out level conversion of a DC voltage. By arranging such an up and down converter, motor 30 can be driven by an AC voltage having an amplitude of higher voltage than the supply voltage of battery 10, and therefore the motor driving efficiency can be improved.

Engine 100 generates driving power having thermal energy from fuel combustion as the source. Power split device 50 can split the driving power generated by engine 100 into a route for transferring to axle 75 to which driving wheels 80a and 80b are coupled via reduction gear 70 to be the vehicle driving force, and into a route for transferring to generator 60. Generator 60 generates electric power as rotated by the driving power transmitted from engine 100 via power split device 50. The electric power generated by generator 60 is used by PCU 20 as the electric power for charging battery 10 or the electric power for driving motor 30.

Motor 30 is driven to rotate by an AC voltage supplied from PCU 20, and the driving power thereof is transferred to driving wheels 80a and 80b via reduction gear 70 to be the vehicle driving force. In a regenerative braking operation mode wherein motor 30 is rotated in accordance with deceleration of driving wheels 80a and 80b, motor 30 functions as a generator.

Hybrid vehicle 1000 runs by the driving power from motor 30 without using the driving power from engine 100, when the vehicle is started to travel and when the vehicle travels with a light load such as when traveling at a low speed or when going down a gentle slope, in order to avoid a range where the engine efficiency is low. Accordingly, in this case, except for the case where the engine must be operated for warm-up or for charging the battery, engine 100 is stopped. When the engine must be operated for warm-up or for charging the battery, engine 100 is caused to idle.

In a normal traveling mode, engine 100 is started, and the driving power output from engine 100 is split into the driving power (vehicle driving force) for driving wheels 80a and 80b and the driving power for generator 60 for generating electric power. The generated electric power from generator 60 is used to drive motor 30. Accordingly, in the normal traveling mode, the driving power from engine 100 is assisted by the driving power from motor 30, and whereby driving wheels 80a and 80b are driven. Hybrid ECU 90 controls the motive power split ratio by power split device 50 so that the total efficiency becomes the maximum. Moreover, in an acceleration mode of full throttle, the electric power supplied from battery 10 is additionally used in driving motor 30, further increasing the driving power for driving wheels 80a and 80b.

In deceleration and braking modes, motor 30 is driven to rotate by driving wheels 80a and 80b to generate electric power. The electric power recovered by regenerative generation of motor 30 is converted by PCU 20 into a DC voltage and used for charging battery 10. When the vehicle parks, engine 100 is automatically stopped.

Thus, by combining the driving power generated by engine 100 and the driving power generated by motor 30 using the electric energy as the source, that is, by controlling the operation of engine 100 and motor 30 in accordance with the vehicle state, the operation of hybrid vehicle 1000 with improved fuel efficiency is attained. In other words, hybrid ECU 90 controls output sharing between motor 30 and engine 100 relative to the required driving power in the entire vehicle in accordance with the operation state, to thereby sets output power distribution of motor 30 and engine 100. Specifically, it generates operation instructions such as an output torque instruction value of motor 30 and an operation point instruction (engine speed, load factor) of engine 100.

Figure 2:
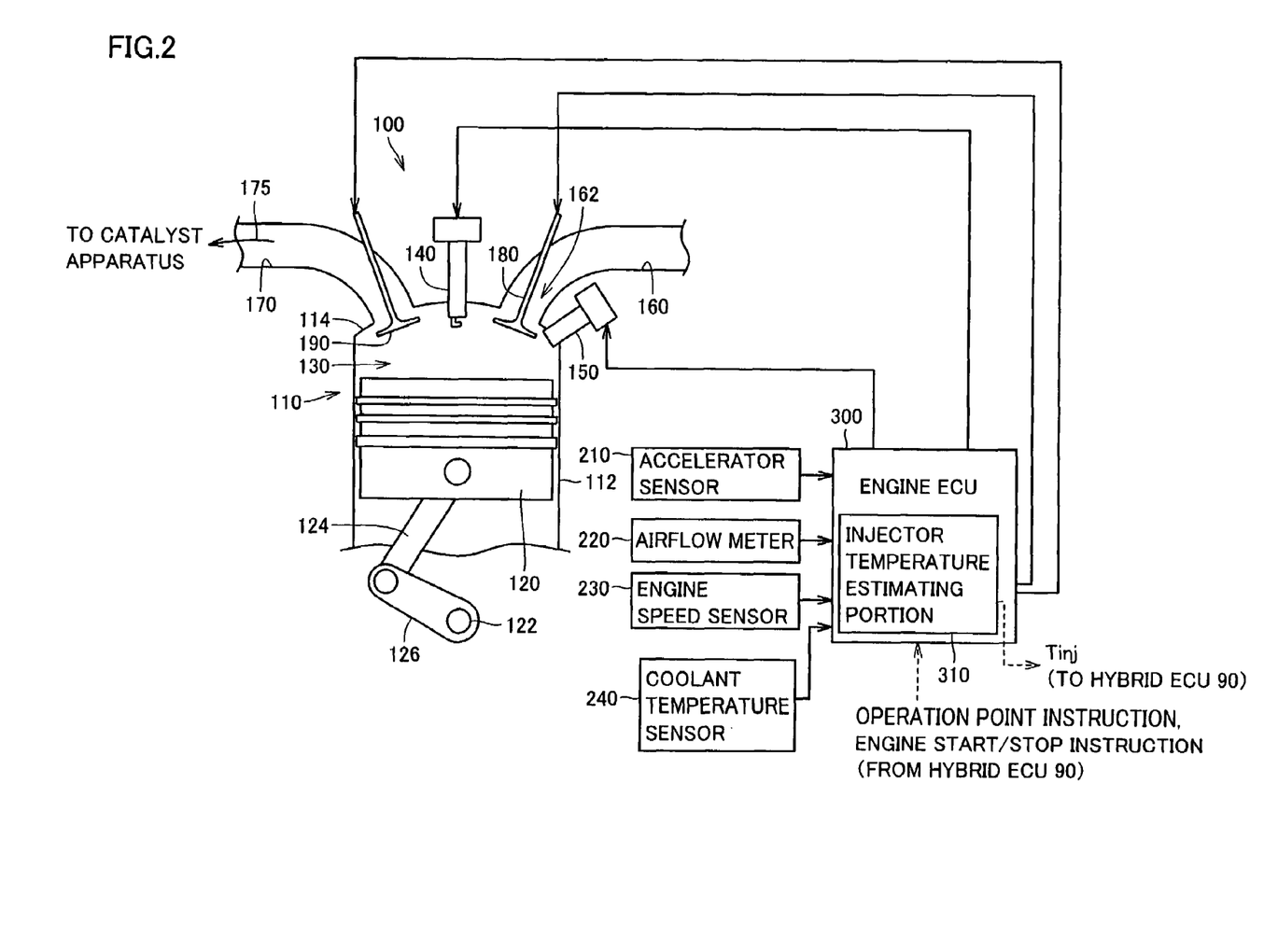
FIG. 2 is a schematic diagram of a configuration of the engine shown in FIG. 1.

FIG. 2 is a schematic diagram of a configuration of engine 100 shown in FIG. 1. Although in FIG. 2 one cylinder of the engine is representatively shown, the number and arrangement of cylinder(s) provided to the internal combustion engine to which an embodiment of the present invention is applied is not limited.

Referring to FIG. 2, engine 100 controlled by engine ECU (Electronic Control Unit) 300 includes a cylinder 110 having a cylinder block 112 and a cylinder head 114 coupled to the upper portion of cylinder block 112, and a piston 120 reciprocating inside cylinder 110. Piston 120 is coupled to a crank shaft 122 being the output shaft of engine 100 via a connecting rod 124 and a crank arm 126. The reciprocating motion of piston 120 is converted by connecting rod 124 into the rotation of crank shaft 122. Inside cylinder 110, the internal wall of cylinder block 112 and cylinder head 114 and the top surface of the piston define a combustion chamber 130 for combusting air-fuel mixture.

To cylinder head 114, a spark plug 140 igniting air-fuel mixture in a manner projecting into combustion chamber 130 and an in-cylinder injector 150 injecting fuel into combustion chamber 130 are arranged. Further, combustion chamber 130 is in communication with an intake manifold 160 and an exhaust manifold 170 via an intake valve 180 and an exhaust valve 190, respectively. Engine 100 incorporated by the hybrid vehicle according to an embodiment of the present invention is configured to include at least in-cylinder injector 150 injecting fuel directly into a cylinder.

Exhaust manifold 170 is coupled to a not-shown catalyst apparatus (for example, a three-way catalyst converter) for removing emission (CO: carbon monoxide, HC: hydrocarbon, NOx: nitrogen oxide) in exhaust gas 175. However, until the catalyst is warmed up and activated, the emission removing capacity of the catalyst apparatus is low, and therefore it is necessary to provide control such that emission in exhaust gas 175 does not increase by a degraded combustion state in combustion chamber 130 at low temperatures.

Engine 100 is further provided with various sensors such as an accelerator sensor 210, an airflow meter 220, an engine speed sensor 230 and coolant temperature sensor 240.

Accelerator sensor 210 is provided near a not-shown accelerator pedal to produce an output voltage corresponding to the pedal position (press-down degree) of the accelerator pedal. Air flow meter 220 generates an output voltage corresponding to an intake air quantity for engine 100. Respective output voltages of accelerator sensor 210 and airflow meter 220 are appropriately subjected to A/D conversion by engine ECU 300, and thereafter taken into a microcomputer provided in engine ECU 300.

Engine speed sensor 230 generates a pulse signal representing the engine speed. The pulse signal from engine speed sensor 230 is taken into the microcomputer in engine ECU 300. Coolant temperature sensor 240 is provided to an internal combustion engine coolant pipe of engine 100 to produce an output voltage in proportion to the internal combustion engine coolant temperature (engine coolant temperature). The output voltage of coolant temperature sensor 240 is appropriately subjected to A/D conversion by engine ECU 300, and thereafter taken into the microcomputer provided in engine ECU 300.

Engine ECU 300 generates various control signals to control the overall operation of engine 100 based on signals from respective sensors, so that the output of engine 100 can be achieved in accordance with engine start/stop instructions and operation point instruction from hybrid ECU 90.

Engine ECU 300 further includes an injector temperature estimating portion 310 estimating the temperature of in-cylinder injector 150 (in particular, the temperature at its tip). The temperature of in-cylinder injector 150 changes by heat transfer from the entire engine to which the injector is coupled and by heat transfer from the temperature in the cylinder (in the combustion chamber). Here, the heat transfer from the entire engine can be estimated from the engine coolant temperature and the outside air temperature. The temperature in the cylinder can be estimated from a combustion state in the combustion chamber, that is, operation conditions (engine speed and load factor) of the engine and air-fuel ratio (A/F).

Accordingly, injector temperature estimating portion 310 can calculate an estimated value of the injector temperature at the time in accordance with a prescribed function employing variables such as the engine coolant temperature and outside air temperature detected by the sensors, engine speed, engine load factor and air-fuel ratio. Such variables or constants of a prescribed function are selected and adjusted generally based on the result of experiments. Alternatively, if the configuration permits, the temperature sensor may directly be provided to in-cylinder injector 150. Thus estimated or measured injector temperature Tinj is sent form engine ECU 300 to hybrid ECU 90.

Figure 3:
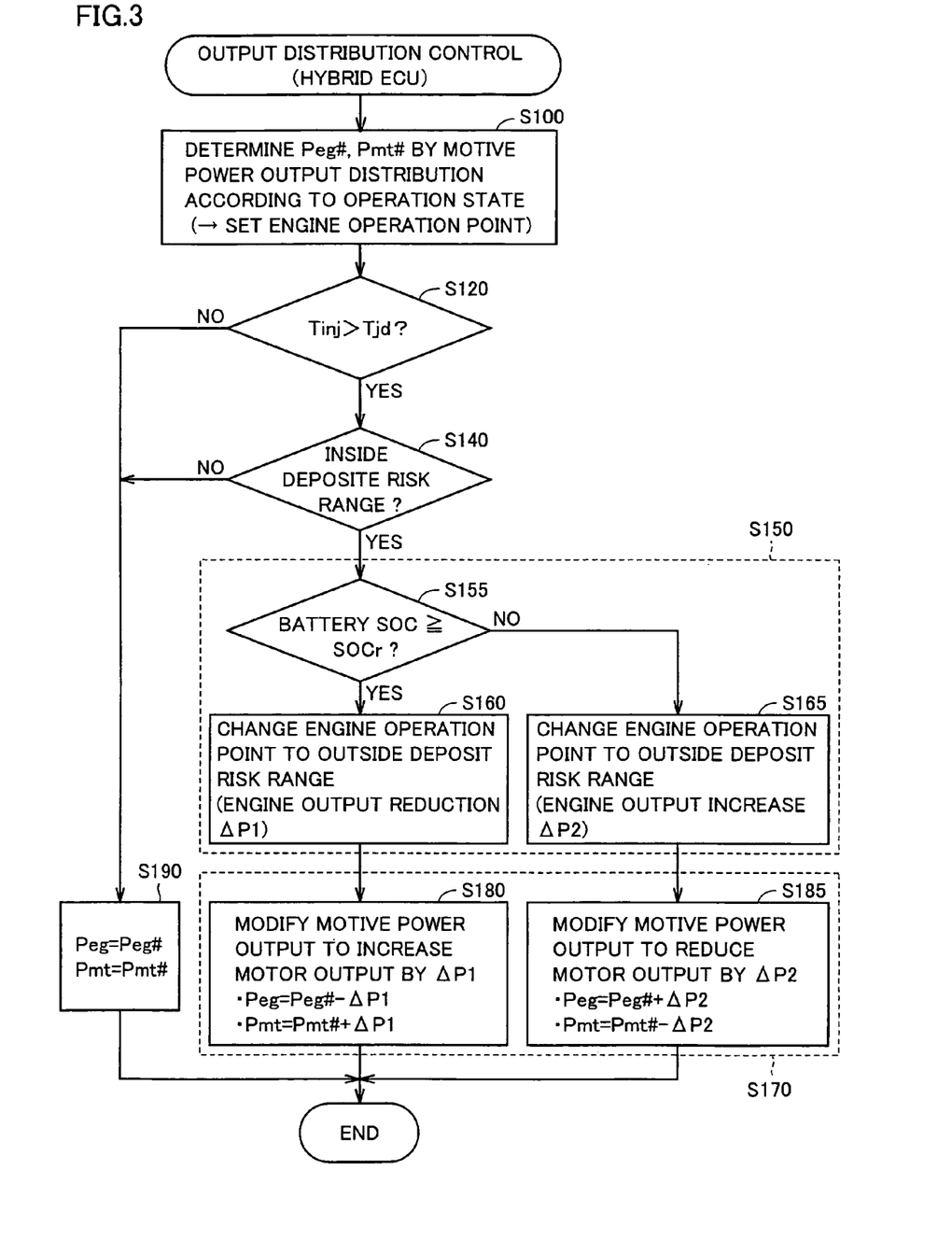
FIG. 3 is a flowchart describing output distribution control between an engine and a motor by the control apparatus for a vehicle according to the present invention.

FIG. 3 is a flowchart describing output distribution control between engine 100 and motor 30 by hybrid ECU 90 corresponding to the control apparatus for a vehicle according to the present invention.

Referring to FIG. 3, hybrid ECU 90 in step S100 primarily determines engine output power Peg# and motor output power Pmt# through basic prescribed output power distribution control between engine 100 and motor 30 in accordance with an operation state. Here, the following equation (1) is satisfied where required output power in the entire vehicle is Pv. Required output Pv corresponds to the output required power in the entire vehicle, which is a combination of vehicle required power by an accelerator pedal operation of the driver, battery-charging required power and the like.

$$Pv=Peg\#+Pmt\# \ldots \quad (1)$$

Further, hybrid ECU 90 sets an operation point (on an engine speed/engine load factor plane) of engine 100 in accordance with output power distribution.

Hybrid ECU 90 in step S120 determines whether an injector temperature Tinj of in-cylinder injector 150 exceeds a prescribed determination temperature Tjd.

When injector temperature Tinj is at most determination temperature Tjd (NO in step S120), hybrid ECU 90 determines by step S190 ultimate engine output power Peg and motor output power Pmt in accordance with the basic (primary) output power distribution of step S100. That is, Peg=Peg#, and, Pmt=Pmt# is set.

When injector temperature Tinj exceeds determination temperature Tjd (YES in step S120), then hybrid ECU 90 determines by step S140 whether the operation range of engine 100 is inside the deposit risk range. Here, the deposit risk range is defined as shown in FIG. 4.

Figure 4:
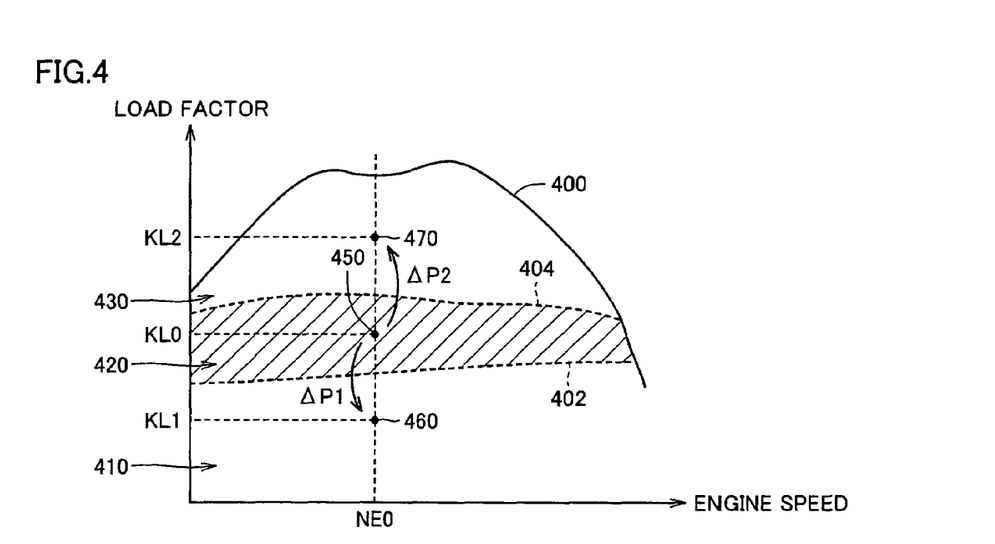
FIG. 4 is a conceptual diagram describing the definition of a deposit risk range and the change of an engine operation point from the deposit risk range.

Referring to FIG. 4, an engine operation point is defined on a plane wherein the axis of abscissas represents the engine speed and axis of ordinates represents the engine load factor. The region inside full load state line 400 defined by a group of engine operation points corresponding to wide open throttle (WOT) of the throttle valve is classified into a low load range 410, an intermediate load range 420, and a high load range 430.

In low load range 410, an intake air quantity for engine 100 is small and the combustion pressure is low, and therefore the temperature in the combustion chamber does not rise and the risk of temperature rising in in-cylinder injector 150 is small. In high load range 430, the cooling effect of in-cylinder injector 150 by latent heat of vaporization of injected fuel being greater in quantity is high. On the other hand, in intermediate load region 420, the combustion heat produced in combustion chamber 130 is great while the injector cooling effect by the injected fuel is low. Accordingly, intermediate load range 420 corresponds to "the deposit risk range" where the temperature rise in in-cylinder injector 150 is most concerned.

Generally, the intake air quantity for engine 100 is set greater as the engine load increases. Accordingly, determination as to a boundary line 420 between low load range 410 and intermediate load range 420 and as to a boundary line 404 between intermediate load range 420 and high load range 430 can basically be made by comparing the intake air quantity for engine 100 measured by airflow meter 220 and a reference value.

While the air-fuel ratio setting value in the homogeneous combustion operation mode in the fuel injection control of engine 100 is normally set so that it corresponds to stoichiometric air-fuel ratio, sometimes such a scheme is employed that the air-fuel ratio setting value is switched to increase fuel (to reduce A/F) than in a normal mode (with the value corresponding to the stoichiometric air-fuel ratio) to thereby ensure the output in the engine high load state. In this case, a normal range where the air-fuel ratio setting value is set corresponding to the stoichiometric air-fuel ratio and an quantity increase range where the air-fuel ratio setting value is set to increase fuel than in the normal range both exist. In the quantity increase range, the cooling effect of in-cylinder injector 150 by latent heat of vaporization of the injected fuel further increases.

Accordingly, when such air-fuel ratio switching control is to be exerted, high load range 430 may be defined to correspond to an operation range (quantity increase range) where fuel increase (A/F setting value reduction) is conducted. That is, determination as to boundary line 404 can be made by comparing the air-fuel ratio (A/F) setting value with the reference value.

In step S140 shown in FIG. 3, whether the operation range of engine 100 is inside the deposit risk range is determined depending on whether an engine operation point represented by engine speed and engine load factor is inside intermediate load region 420 shown in FIG. 4.

Figure 5:
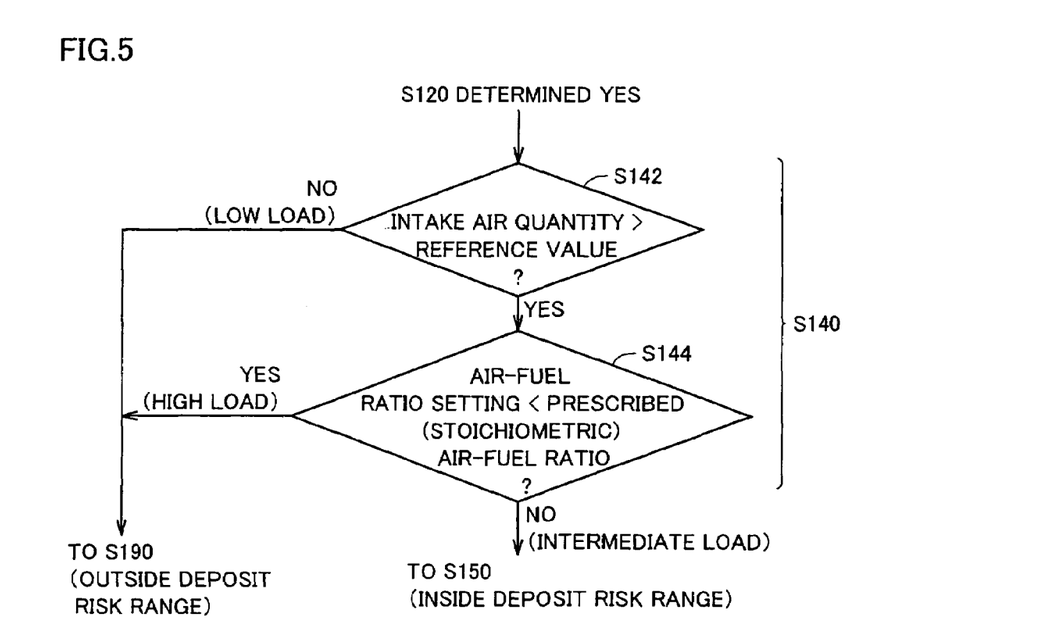
FIG. 5 describes detail of a step of determining whether it is in the deposit risk range shown in FIG. 3.

FIG. 5 shows the determination flow in step S140 in FIG. 3 in further detail. Referring to FIG. 5, step S140 includes steps S142 and S144.

Hybrid ECU 90 determines whether an intake air quantity for engine 100 measured by airflow meter 220 is more than the reference value. Thus, whether the current engine operation point exists above boundary line 402 in FIG. 4 (intermediate load range 420 and high load range 430) or below boundary line 402 (low load range 410) can be determined. When NO in step S142, hybrid ECU 90 determines that the engine operation point is outside the deposit risk range since the engine operation point exists in low load range 410. That is, the determination result in step S140 is "NO".

On the other hand, when YES in step S142, that is, when the engine operation point is positioned higher than boundary line 402 (higher load), hybrid ECU 90 determines by step S144 whether the air-fuel ratio setting value is set to increase fuel (to reduce A/F) than a prescribed air-fuel ratio set corresponding to the stoichiometric air-fuel ratio. Thus, whether the current engine operation point exists above boundary line 404 in FIG. 4 (high load range 430) or below boundary line 404 (intermediate load range 420) can be determined.

When YES in step S144, that is, when the air-fuel ratio setting value is set to increase fuel (to reduce A/F) than a prescribed air-fuel ratio (normal value), hybrid ECU 90 determines that the engine operation point is outside the deposit risk range since the engine operation point is in high load range 430. That is, the determination result in step S140 is "NO".

On the other hand, when NO in step S144, that is, when the engine operation point is positioned below boundary line 404, hybrid ECU 90 determines that the engine operation point is inside intermediate load range 420 in FIG. 4. Accordingly, hybrid ECU 90 determines that the engine operation point is inside the deposit risk range. That is, the determination result in step S140 is "YES".

FIG. 5 shows the deposit risk range determination scheme where the air-fuel ratio switching control for switching the air-fuel ratio setting value to increase fuel than in a normal operation is exerted in the engine high load state. When such air-fuel ratio switching control is not to be exerted, the determination as to boundary line 404 in step S144 (determination between intermediate load range 420 and high load range 430) can be conducted by comparing the intake air quantity with a reference value. That is, based on an intake air quantity for engine 100 measured by airflow meter 220, if the intake air quantity is more than a reference value being set separately from step S142, then high load range 430 is determined. If it is at most the reference value, intermediate range 420 is determined.

As above, the determination as to whether the operating range of engine 100 is inside the deposit risk range can be made based on at least an intake air quantity. Further, when the air-fuel ratio switching control as described above is to be exerted, by taking into account of the air-fuel ratio setting value, the deposit risk range can be defined further appropriately.

It is noted that the setting of the deposit risk range in applying the present invention shown in FIGS. 4 and 5 are just an example, and the deposit risk range can be set according to other schemes.

Referring to FIG. 3 again, when NO in step S140, the current engine operation point is outside the deposit risk range and not in the temperature range where temperature rise in in-cylinder 150 is concerned. Accordingly, similarly to the case when NO in step S120, hybrid ECU 90 executes step S190. That is, ultimate engine output power Peg and motor output power Pmt are determined in accordance with the basic output power distribution of step S100. That is, Peg=Peg#, and, Pmt=Pmt# is set.

On the other hand, when the engine operation point is in the deposit risk range (when YES in step S140), hybrid ECU 90 changes the operation point of engine 100 by executing step S150.

Referring to FIG. 4 again, the change of engine operation point by step S150 is described.

In step S150, when current engine operation point 450 is inside intermediate load range 420 corresponding to the deposit risk range, the operation point change is performed so as not to bring discomfort for the driver. Representatively, the load factor is increased or reduced while the engine speed is maintained constantly, whereby the engine operation point is changed.

For example, as the change of engine operation point 450 inside intermediate load range 420 (engine speed NE0, load factor KL0), both the change to engine operation point 460 (engine speed NE0, load factor KL1 (<KL0)) inside low load range 410 by reducing the engine load factor, and the change to engine operation point 470 (engine speed NE0, load factor KL2 (>KL0)) inside high load range 430 by increasing the engine load factor are possible. Here, an output change (reduction) of engine 100 by a change from engine operation point 450 to engine operation point 460 for reducing the load factor is ΔP1 and an output change (increase) of engine 100 by a change from engine operation point 450 to engine operation point 470 for increasing the load factor is ΔP2.

Referring to FIG. 3 again, step S150 includes step S155 of comparing a charge quantity of battery 10 with a reference quantity, and steps S160 and S165 of changing the operation point of the engine in accordance with the determination result in step S155.

Hybrid ECU 90 determines whether battery SOC (State of Charge) indicative of the charge quantity of battery 10 exceeds a prescribed reference quantity SOCr.

When battery SOC is at least reference quantity SOCr (YES in step S155), the battery charge quantity is reserved enough and the output power of motor 30 can be increased. Accordingly, hybrid ECU 90 changes the engine operation point in a direction reducing the engine output power, to thereby set the engine operation point outside the deposit risk range (intermediate load range 420). That is, the operation in step S160 corresponds to the change from engine operation point 450 to engine operation point 460 in FIG. 4. Consequently, the engine output power decreases by ΔP1.

On the other hand, when the battery SOC is less than the reference quantity SOCr (NO in step S155), the battery charge quantity is not reserved enough and it is difficult to increase the output power of motor 30. Accordingly, hybrid ECU 90 changes engine operation point in a direction increasing the engine output power, to thereby set the engine operation point outside the deposit risk range (intermediate range 420). That is, the operation in step S165 corresponds to the change from engine operation point 450 to engine operation point 470 in FIG. 4. Consequently, the engine output power increases by ΔP2.

Step S170 includes steps S180 and S185 of performing an output power distribution modification in accordance with the change of the engine operation point in steps S160 and S165.

In step S180, hybrid ECU 90 modifies the output power distribution so that the decrease of ΔP1 in the engine output power by the change of the engine operation point in step S160 is compensated for by motor 30. That is, in step S180, ultimate engine output power Peg and motor output power Pmt are determined in accordance with the following equations (2) and (3).

$$Peg=Peg\#-\Delta P1 \ldots \quad (2)$$

$$Pmt=Pmt\#+\Delta P1 \ldots \quad (3)$$

On the other hand, hybrid ECU 90 modifies the output power distribution so that the increase of ΔP2 in the engine output power by the change of the engine operation point in step S165 is compensated for by motor 30. That is, in step S185, ultimate engine output power Peg and motor output power Pmt are determined in accordance with the following equations (4) and (5).

$$Peg=Peg\#+\Delta P2 \ldots \quad (4)$$

$$Pmt=Pmt\#-\Delta P2 \ldots \quad (5)$$

With such a configuration, in the hybrid vehicle controlled by the control apparatus for a vehicle according to the present invention, when the temperature of in-cylinder injector 150 rises and clogging of the injector due to deposit accumulation is concerned, the engine operation point is prevented from being set in the deposit risk range where the injector temperature may further rise.

As a result, the engine operation point setting is enabled in a hybrid vehicle incorporating an internal engine having an in-cylinder injector and a motor, which avoids clogging of the in-cylinder injector.

Here, correspondence between the flowchart shown in FIG. 3 and the constitution of the present invention is described. Step S100 corresponds to "first output distribution controlling means (portion)" of the present invention; step S120 corresponds to "temperature determining means (portion)" of the present invention; and step S140 corresponds to "operation range determining means (portion)" of the present invention. Further, step S150 including steps S155-S165 corresponds to "operation range changing means (portion)" of the present invention, and step S170 including steps S180 and S185 corresponds to "second output distribution controlling means (portion)" of the present invention.

Figure 6:
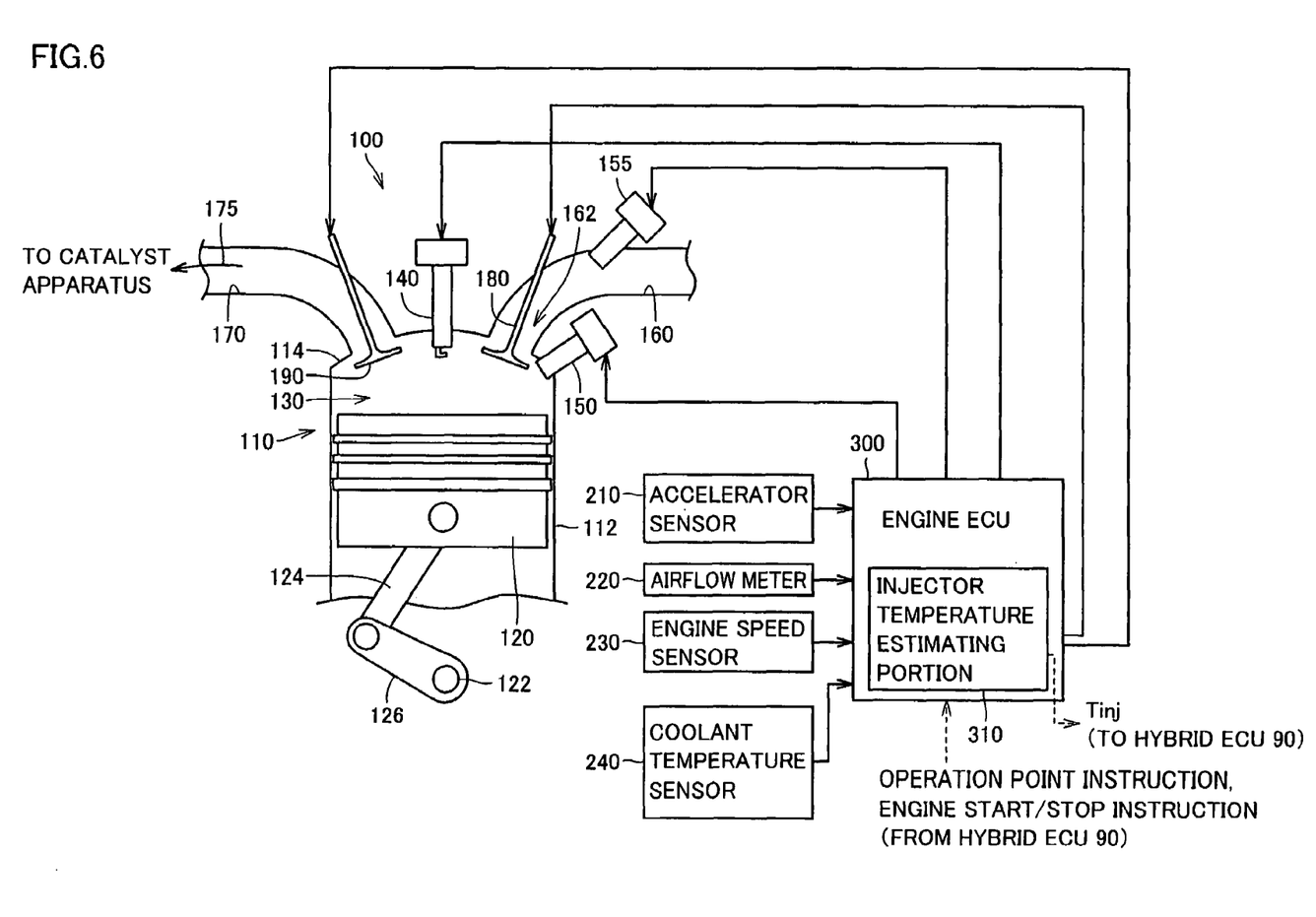
FIG. 6 is a schematic diagram showing other configuration example of the engine incorporated in the hybrid vehicle controlled by the control apparatus for a vehicle according to an embodiment of the present invention.

It is possible to employ an engine that further includes, in addition to in-cylinder injector 150, intake manifold injector 155 for injecting fuel into an intake manifold and/or intake port such as shown in FIG. 6 may be used as engine 100 shown in FIG. 1. In this case also, by the output power distribution control similarly to that shown in the flowchart of FIG. 3, clogging due to deposit accumulation in in-cylinder injector 150 can be avoided.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control apparatus for a vehicle incorporating an internal combustion engine and a motor that are capable of transmitting motive power to an axle, comprising:
    first output distribution controlling means for controlling motive power output distribution between said internal combustion engine and said motor with respect to a total required output in accordance with an operation state of said vehicle;
    temperature determining means for determining whether a temperature of fuel injection means directly injecting fuel into a combustion chamber of said internal combustion engine exceeds a prescribed determination temperature;
    operation range determining means for determining whether an operation point of said internal combustion engine is inside a prescribed range in which risk of deposit accumulation in said fuel injection means is high;
    operation range changing means for changing said operation point to outside said prescribed range when the temperature of said fuel injection means exceeds said prescribed determination temperature and the operation point of said internal combustion engine is inside said prescribed range; and
    second output distribution controlling means for modifying said motive power output distribution determined by said first output distribution controlling means so that an output from said motor is changed to compensate for an output change of said internal combustion engine associated with the change of said operation point by said operation range changing means.

2. The control apparatus for a vehicle according to claim 1, wherein
    said vehicle further incorporates a battery provided as a source of driving power of said motor,
    said operation range changing means has means for changing said operation point from inside said prescribed range to outside said prescribed range in a direction reducing an output from said internal combustion engine when a charge quantity of said battery is at least a reference quantity; and
    said second output distribution controlling means has means for increasing the output from said motor by a reduction in the output from said internal combustion engine.

3. The control apparatus for a vehicle according to claim 1, wherein
    said vehicle further incorporates a battery provided as a source of driving power of said motor,
    said operation range changing means has means for changing said operation point from inside said prescribed range to outside said prescribed range in a direction increasing an output from said internal combustion engine when a charge quantity of said battery is less than a reference quantity; and
    said second output distribution controlling means has means for reducing the output from said motor by an increase in the output from said internal combustion engine.

4. The control apparatus for a vehicle according to claim 1, wherein
    said operation range changing means changes said operation point from inside said prescribed range to outside said prescribed range by changing a load factor of said internal combustion engine while maintaining a speed of said internal combustion engine.

5. The control apparatus for a vehicle according to claim 1, wherein
said operation range determining means determines whether the operation point of said internal combustion engine is inside said prescribed range based on at least an intake air quantity of said internal combustion engine.

6. The control apparatus for a vehicle according to claim 5, wherein
an operation range of said internal combustion engine includes a first range in which an air-fuel ratio setting value of said combustion chamber is set corresponding to a stoichiometric air-fuel ratio and a second range in which said air-fuel ratio setting value is set to increase fuel relative to said first range, and
said operation range determining means determines that the operation point of said internal combustion engine is inside said prescribed range when the intake air quantity of said internal combustion engine exceeds a reference quantity and said operation range is said first range.

7. A control apparatus for a vehicle incorporating an internal combustion engine and a motor that are capable of transmitting motive power to an axle, comprising:
a first output distribution controlling portion configured to control motive power output distribution between said internal combustion engine and said motor with respect to a total required output in accordance with an operation state of said vehicle;
a temperature determining portion configured to determine whether a temperature of a fuel injection mechanism directly injecting fuel into a combustion chamber of said internal combustion engine exceeds a prescribed determination temperature;
an operation range determining portion configured to determine whether an operation point of said internal combustion engine is inside a prescribed range in which risk of deposit accumulation in said fuel injection mechanism is high;
an operation range changing portion configured to change said operation point to outside said prescribed range when the temperature of said fuel injection mechanism exceeds a prescribed temperature and the operation point of said internal combustion engine is inside said prescribed range; and
a second output distribution controlling portion configured to modify said motive power output distribution determined by said first output distribution controlling portion so that an output from said motor is changed to compensate for an output change of said internal combustion engine associated with the change of said operation point by said operation range changing portion.

8. The control apparatus for a vehicle according to claim 7, wherein
said vehicle further incorporates a battery provided as a source of driving power of said motor,
said operation range changing portion changes said operation point from inside said prescribed range to outside said prescribed range in a direction reducing an output from said internal combustion engine when a charge quantity of said battery is at least a reference quantity; and
said second output distribution controlling portion increases the output from said motor by a reduction in the output from said internal combustion engine.

9. The control apparatus for a vehicle according to claim 7, wherein
said vehicle further incorporates a battery provided as a source of driving power of said motor,
said operation range changing portion changes said operation point from inside said prescribed range to outside said prescribed range in a direction increasing an output from said internal combustion engine when a charge quantity of said battery is less than a reference quantity; and
said second output distribution controlling portion reduces the output from said motor by an increase in the output from said internal combustion engine.

10. The control apparatus for a vehicle according to claim 7, wherein
said operation range changing portion changes said operation point from inside said prescribed range to outside said prescribed range by changing a load factor of said internal combustion engine while maintaining a speed of said internal combustion engine.

11. The control apparatus for a vehicle according to claim 7, wherein
said operation range determining portion determines whether the operation point of said internal combustion engine is inside said prescribed range based on at least an intake air quantity of said internal combustion engine.

12. The control apparatus for a vehicle according to claim 11, wherein
an operation range of said internal combustion engine includes a first range in which an air-fuel ratio setting value of said combustion chamber is set corresponding to a stoichiometric air-fuel ratio and a second range in which said air-fuel ratio setting value is set to increase fuel relative to said first range, and
said operation range determining portion determines that the operation point of said internal combustion engine is inside said prescribed range when the intake air quantity of said internal combustion engine exceeds a reference quantity and said operation range is said first range.

13. A hybrid vehicle comprising:
an internal combustion engine and a motor that are capable of transmitting motive power to an axle; and
a control apparatus, wherein
said control apparatus controls motive power output distribution between said internal combustion engine and said motor with respect to total required output in accordance with an operation state of said hybrid vehicle, determines whether a temperature of fuel injection mechanism directly injecting fuel into a combustion chamber of said internal combustion engine exceeds a prescribed determination temperature, and determines whether an operation point of said internal combustion engine is inside a prescribed range in which risk of deposit accumulation in said fuel injection mechanism is high, and wherein
said control apparatus changes said operation point to outside said prescribed range when the temperature of said fuel injection mechanism exceeds said prescribed determination temperature and the operation point of said internal combustion engine is inside said prescribed range and modifies said motive power output distribution so that an output from said motor is changed to compensate for an output change of said internal combustion engine associated with the change of said operation point.

* * * * *